Feb. 4, 1930.  L. HAMER  1,745,615
STEERING WHEEL SWITCH
Filed June 18, 1927
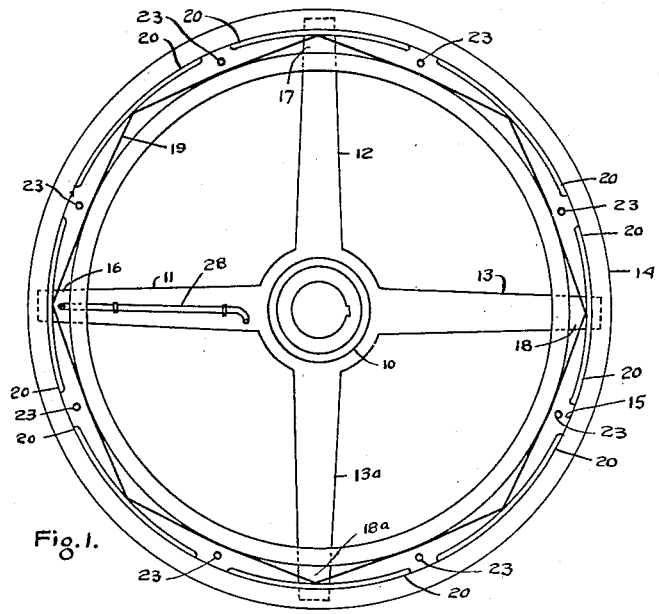
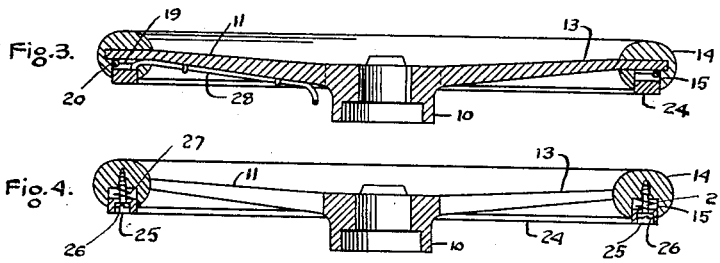
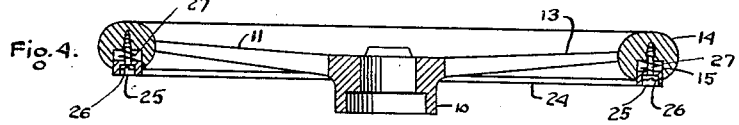
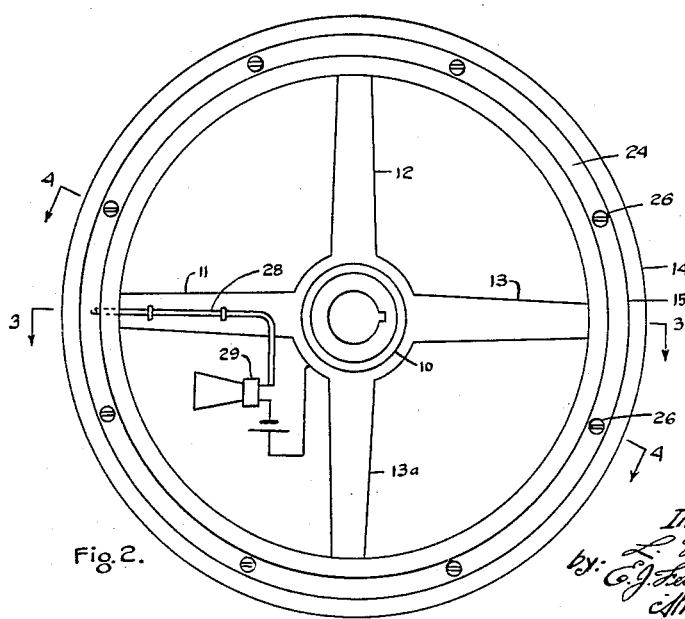
Inventor
L. Hamer
by: C.J. Featherstonhaugh
Attorney.

Patented Feb. 4, 1930

1,745,615

UNITED STATES PATENT OFFICE

LOUIS HAMER, OF MONTREAL, QUEBEC, CANADA

STEERING-WHEEL SWITCH

Application filed June 18, 1927. Serial No. 199,768.

The invention relates to a steering wheel, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to insure the safety of life and property by leaving the hand or hands of a driver constantly on the wheel, so that such acts as sounding the horn or energizing electrical circuits for other purposes may be accomplished while steering the vehicle; to construct a wheel with an electrical switch operable in any part of the rim thereof by special pressure only and not liable to accidental operation; to facilitate the driving of a motor car for the most experienced professional and amateur drivers as well as for less experienced owners and users of cars; to enable the driver to signal and blow the horn simultaneously; to furnish this device at a minimum cost; and generally to provide a safe and efficient device for the aforesaid purposes.

In the drawings, Figure 1 is a plan view of a steering wheel of a conventional pattern and having metal spokes and a wooden rim and showing the inner ground contacts and wiring.

Figure 2 is a plan view of the wheel showing the coacting contact.

Figure 3 is a cross sectional view on the line 3—3 in Figure 2.

Figure 4 is a cross sectional view on the line 4—4 in Figure 2.

Like numerals of reference indicate corresponding parts in the various figures.

Referring to the drawings, the numeral 10 indicates the hub of the wheel from which the metal spokes 11, 12 and 13 extend into the rim 14, which is annularly grooved at 15 in the under side disclosing the spoke ends 16, 17 and 18. The live wire 19 extends around the groove 15 in the bed thereof and is connected to the ground represented by the spoke ends 16, 17 and 18, preferably being simply soldered thereto. The wire 19 is also connected to the heavier wire contacts 20 being soldered thereto. The contacts 20 are inwardly turned at the ends into the wood of the well in the bed of the groove 15 and follow the curve of the outer wall of said groove and stand up from said bed, these contacts being spaced from one another at intervals leaving the spaces for the screw holes 23.

The operating contact is an annular ring 24 preferably of flat metal and having screw holes 25 through which the screws 26 are inserted into the holes 23, said screws between the bed of the groove 15 and the ring 24 being encircled by the springs 27, which normally keep the contacts 20 away from the contact 24.

The insulated wire 28 forms the connection between the ring 24 and the source of electrical energy and completes an electrical circuit in which the electrical horn 29 is included or any other signal device.

The operation of this steering wheel is similar to any other in regard to its functions in guiding the vehicle, but its auxiliary device namely the electrical switch normally held open by spring pressure enables the driver to always maintain his hold of the wheel, when blowing his horn, as for instance he can give his signal on turning a corner and at the same time sound his horn and during speed driving, he can firmly hold the wheel with both hands and sound the horn.

The difficulties in other devices heretofore has been the continual operation of the signal mechanism through the firm grip of the wheel and this has been avoided in the present invention by the construction shown and described.

What I claim is:—

A steering wheel rim having an annular groove, a wire forming a continuous electrical ground connection between the spokes, a plurality of segmental contacts in a corner of said groove and buried in the wood at either end and centrally connected to said ground wire and a floating annular ring in said groove and slidable inwardly to engage said segmental contacts against outward spring pressure and engaging on either side the wall surfaces of the groove and included in a suitably energized electrical circuit having translating devices therein.

Signed at Montreal, Canada, this 1st day of June, 1927.

LOUIS HAMER.